(12) United States Patent
Detrick

(10) Patent No.: US 12,200,285 B2
(45) Date of Patent: Jan. 14, 2025

(54) TECHNOLOGIES FOR MANAGING COLLABORATIVE AND MULTIPLATFORM MEDIA CONTENT PLAYLISTS

(71) Applicant: QUEUED UP, LLC, Altoona, WI (US)

(72) Inventor: Jackson A. Detrick, Eau Claire, WI (US)

(73) Assignee: QUEUED UP, LLC, Altoona, WI (US)

( * ) Notice: Subject to any disclaimer, the term of this patent is extended or adjusted under 35 U.S.C. 154(b) by 0 days.

(21) Appl. No.: 17/691,819

(22) Filed: Mar. 10, 2022

(65) Prior Publication Data
US 2022/0295133 A1    Sep. 15, 2022

Related U.S. Application Data

(60) Provisional application No. 63/159,049, filed on Mar. 10, 2021.

(51) Int. Cl.
| | |
|---|---|
| *G06F 15/16* | (2006.01) |
| *G06F 16/638* | (2019.01) |
| *G06F 16/683* | (2019.01) |
| *H04N 21/218* | (2011.01) |
| *H04N 21/262* | (2011.01) |

(52) U.S. Cl.
CPC ..... *H04N 21/26258* (2013.01); *G06F 16/639* (2019.01); *G06F 16/683* (2019.01); *H04N 21/218* (2013.01)

(58) Field of Classification Search
CPC ............ H04N 21/26258; H04N 21/218; G06F 16/683; G06F 16/639
See application file for complete search history.

(56) References Cited

U.S. PATENT DOCUMENTS

| | | | |
|---|---|---|---|
| 6,248,946 B1 * | 6/2001 | Dwek ..................... | G06F 16/64 707/E17.101 |
| 9,424,604 B2 * | 8/2016 | Boulter ................. | G06F 16/635 |
| 2012/0158531 A1 * | 6/2012 | Dion ...................... | G06Q 30/02 705/26.1 |
| 2012/0227064 A1 * | 9/2012 | Neill ..................... | H04N 21/252 725/14 |
| 2013/0191454 A1 * | 7/2013 | Oliver .................... | G06Q 10/10 709/204 |
| 2013/0246522 A1 * | 9/2013 | Bilinski ............. | H04N 21/4758 709/204 |
| 2014/0229828 A1 * | 8/2014 | Bilinski .................... | G06F 3/01 715/716 |

(Continued)

*Primary Examiner* — Oleg Survillo
(74) *Attorney, Agent, or Firm* — Barnes & Thornburg LLP

(57) ABSTRACT

Techniques are described herein for creating, managing, and playing back a collaborative playlist. A platform server receives a request from a first of multiple users to insert a first media content item to the collaborative playlist. The first media content item is provided by a first media content service of multiple heterogeneous media content services. The platform server receives a request from a second of multiple users to insert a second media content item to the collaborative playlist. The second media content item is provided by a second media content service. The platform server generates a first entry and a second entry, each corresponding to the first and second media content items, respectively. The platform server inserts the first and second entries to the collaborative playlist.

20 Claims, 7 Drawing Sheets

(56) References Cited

U.S. PATENT DOCUMENTS

| | | | |
|---|---|---|---|
| 2016/0087928 A1* | 3/2016 | Soldner | H04L 12/1831 |
| | | | 709/206 |
| 2016/0117144 A1* | 4/2016 | Soldner | H04L 63/00 |
| | | | 700/94 |
| 2018/0032611 A1* | 2/2018 | Cameron | G06F 16/685 |
| 2020/0090537 A1* | 3/2020 | Le Chevalier | A63F 13/60 |
| 2021/0320971 A1* | 10/2021 | Lebowitz | G06F 16/635 |

* cited by examiner

TECHNOLOGIES FOR MANAGING COLLABORATIVE AND MULTIPLATFORM MEDIA CONTENT PLAYLISTS

CROSS-REFERENCE TO RELATED APPLICATIONS

This application claims priority to U.S. Provisional Patent Application No. 63/159,049, entitled, "Systems, Methods, Components, and Software for Multiparty, Multiplatform, Creation, Playing, and Sharing of Playlists," filed Mar. 10, 2021. The disclosure set forth in the referenced application is incorporated herein by reference in its entirety.

FIELD

The present disclosure generally relates to media content delivery, and more particularly to techniques for managing and playing collaborative media content playlists including content items of heterogeneous content delivery services.

BACKGROUND

Consumers of digital media content have various means for accessing content. For example, a media content provider may host a platform that allows an individual to stream content, such as audio and video media, through an application executing on a mobile device of the consumer. Such applications may provide a playlist function that allows the individual to specify, in a playlist, one or more content items in a desired order for subsequent play in that order. The playlist function enhances the user experience by giving the individual control over the order in which the content is played, such that the individual can curate a given playlist to fit a given setting, such as a social gathering or an individual or group exercise session. For example, a host of a party may create a playlist of songs in an application provided by a music streaming service that sets a desired mood for the party. As another example, a group exercise instructor may create a playlist of songs through the application that is sequenced to keep people motivated during an exercise session.

SUMMARY

Embodiments presented herein disclose a system and techniques for managing and playing collaborative media playlists.

One embodiment presented herein discloses a method for managing a collaborative playlist. The method generally includes receiving, by executing of one or more processors, a request from a first user of a plurality of users to insert a first media content item to the collaborative playlist. The first media content item is provided by a first media content service of a plurality of media content services. The method also generally includes receiving a request from a second user of the plurality of users to insert a second media content item to the collaborative playlist. The second media content item is provided by a second media content service of the plurality of media content services. A first entry corresponding to the first content media item and a second entry corresponding to the second media content item are generated. The first entry and the second entry are inserted to the collaborative playlist.

Another embodiment presented herein discloses a system having one or more processors and a memory storing a plurality of instructions, which, when executed by the one or more processors, causes the system to receive a request from a first user of a plurality of users to insert a first media content item to the collaborative playlist. The first media content item is provided by a first media content service of a plurality of media content services. The instructions, when executed, also cause the system to receive a request from a second user of the plurality of users to insert a second media content item to the collaborative playlist. The second media content item is provided by a second media content service of the plurality of media content services. A first entry corresponding to the first content media item and a second entry corresponding to the second media content item are generated. The first entry and the second entry are inserted to the collaborative playlist.

Yet another embodiment presented herein discloses a computer-readable storage medium storing a plurality of instructions, which, when executed by one or more processors, causes a system to receive a request from a first user of a plurality of users to insert a first media content item to the collaborative playlist. The first media content item is provided by a first media content service of a plurality of media content services. The instructions, when executed, also cause the system to receive a request from a second user of the plurality of users to insert a second media content item to the collaborative playlist. The second media content item is provided by a second media content service of the plurality of media content services. A first entry corresponding to the first content media item and a second entry corresponding to the second media content item are generated. The first entry and the second entry are inserted to the collaborative playlist.

DETAILED DESCRIPTION

Figure 1:
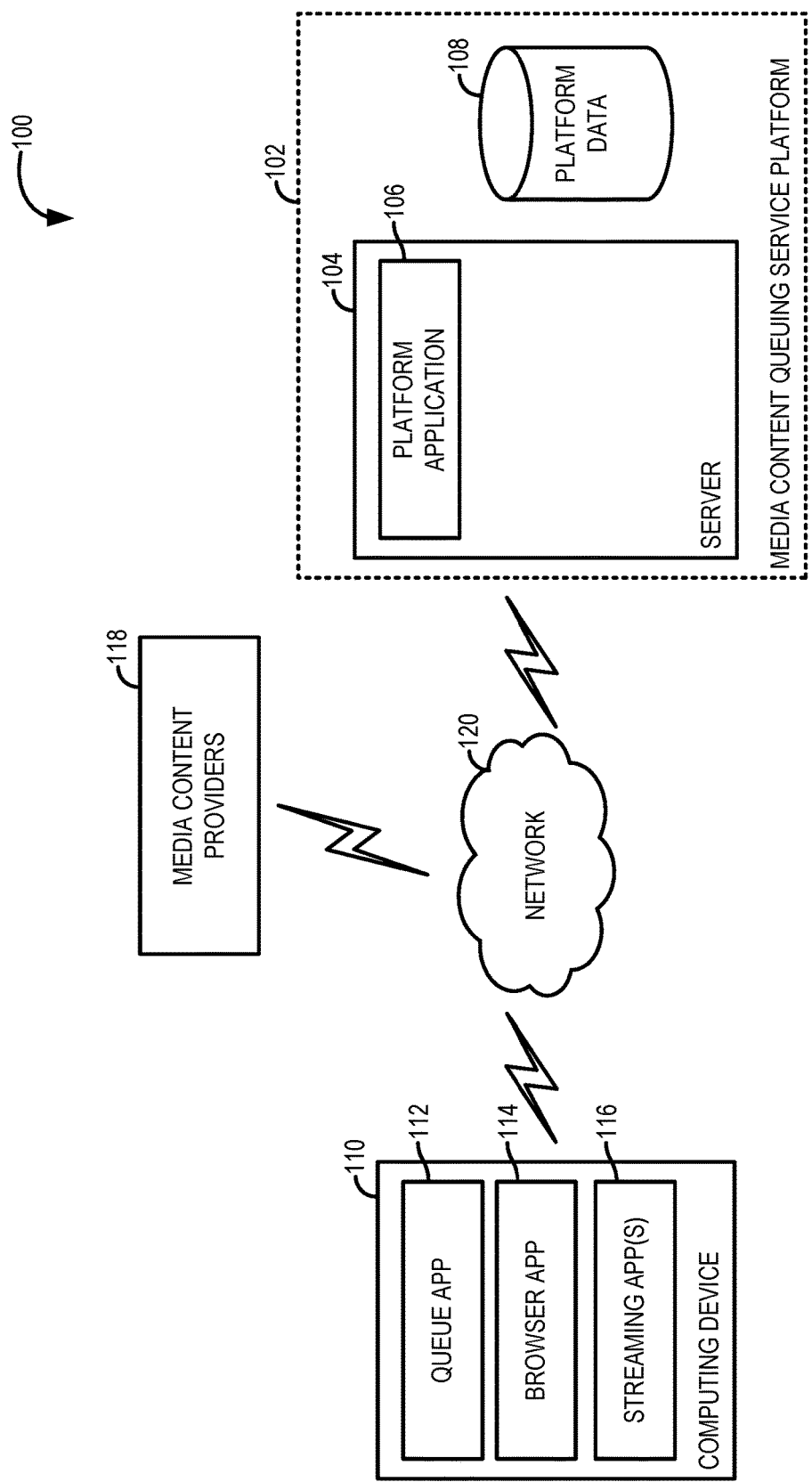
FIG. 1 illustrates a computing environment in which an example media content queuing service platform operates, according to an embodiment.

Typically, a playlist function in an application of a media content provider (e.g., an entity that provides audio or video media content to a consumer such as through digital streaming) is operated entirely by an individual user. More particularly, the individual user creates a playlist and populates the playlist with desired media. At times, however, individual control over the playlist may not be ideal. For example, a host of a party may create a playlist of songs via a music streaming application (e.g., SPOTIFY, AMAZON MUSIC, YOUTUBE MUSIC, etc.) to set a certain mood for the party. However, it is possible that the selected songs from the playlist do not resonate with the guests. In addition, guests may want to add a song to the playlist, but to do so, the guests would need to access the host's device to add the song or request the host to do so, which can inconvenience both the host and the guests. Further, given the proliferation of media content providers offering their own content delivery services to consumers, certain content on one service may be unavailable on another service for various reasons, such as licensing rights to the content. Thus, content desired by a guest may be unavailable on the application used by the host but may be available on another service.

To address these issues, embodiments presented herein disclose a system and techniques for creating, managing, and playing collaborative media content playlists. More particularly, embodiments disclose a platform that allows multiple users to specify desired content items to an individual playlist, in which the content items may originate from multiple, heterogeneous media content providers. As further described herein, the platform may provide an application ("app") that executes on a user computing device, such as a mobile device of the user. The app enables a user to initialize creation of a playlist and specify various parameters associated with the playlist, including access by other users to contribute to the playlist through their own computing devices executing the app.

Advantageously, the embodiments described herein provide an approach for a managing a collaborative playlist that improves upon prior approaches for playlist creation, management, and playback. For example, the platform allows multiple users to contribute to a given playlist through their own device rather than a single and centralized device and location. Further advantageously, the platform allows users to incorporate media content from heterogeneous sources into a single playlist, which alleviates the need to play certain content on individual services and switching back and forth between services during, for example, a social gathering where it would be inconvenient to do so. Instead, users can include content that might not be available on a given service to a playlist, while continuing to add content from that given service into the playlist. The ordered combination of elements provided by the application environment provides a more efficient solution for integrating content of these heterogeneous sources into a unified structure and playing the content within a single application executing on a device.

Referring now to FIG. 1, an example computing environment 100 includes a media content queuing service platform (also referred to herein as "platform") 102, one or more computing devices 110, and media content providers 118, each interconnected wirelessly or over a wired line via a network 120 (e.g., the Internet).

In an embodiment, the platform 102 represents a Software-as-a-Service (SaaS) platform accessible by the computing devices 110 over the network 120. The platform 102 further includes one or more servers 104 and platform data 108. Any of the one or more servers 104 may be embodied a physical computing system or as a virtual computing instance (e.g., executing over a cloud network). As further described herein, the platform data 108 may be embodied as any data created and/or managed by the platform application 104.

Illustratively, the server 104 includes a platform application 106. The platform application 106 includes one or more services for providing a collaborative media content queuing (also referred to herein as a "collaborative playlist") platform for users. In an embodiment, the server 104 also hosts the platform data 108. Alternatively or in addition, platform data 108 may be maybe be hosted by one or more cloud storage services to allow for a secure and relatively efficient means of data management.

A user may access certain services of the platform application 106 via a computing device 110. The computing device 110 may be embodied as any type of computing device used to access the platform 102, such as a physical computing system (e.g., a mobile device such as a smartphone, tablet, or a wearable device, a desktop computer, a workstation computer, etc.) or a virtual computing instance (e.g., executing over a cloud network). As shown, the computing device 110 includes a queue app 112, a browser app 114, and one or more streaming apps 116. In an embodiment, a streaming app 116 is an application through which the user can access a content streaming service provided by a given media content provider 118. Generally, a media content provider 118 may be any entity that delivers content to a user, such as a streaming service, a file hosting service, and so on. Examples of a media content provider 118 that provides content through the streaming apps 116 include an audio content streaming service (e.g., music streaming services, audiobook services, podcast services, etc.), a video content streaming service (e.g., video sharing platforms, video on-demand services, live streaming services, etc.), gaming services, and so on.

The queue app 112 provides a user interface for features provided by the platform application 106, such as playlist creation, user configuration, content provider user credentials management, playlist configuration, billing information, and the like. In an embodiment, the platform application 112 may include a web service accessible through the browser app 114. The web service may provide a front-end user interface including the features incorporated in the queue app 112. The queue app 112 and web service accessible by the browser app 114 may provide a front-end interface for the user, and the platform application 112 may serve as the backend for the underlying functionalities of the platform 102. For example, processing tasks (e.g., playlist generation in the backend, application programming interface (API) calls to various media content providers 118 to access content items and other data, propagating updates to various users) may occur in the backend (using cloud resources) rather than by the queue app 112 executing on the computing device 110 to ensure efficient usage of computing resources.

As further described herein, the user may create, via the queue app 112, a playlist to which other uses may contribute content items associated with services provided by various media content providers 118. In an embodiment, the queue app 112 enables the creator user (also referred to herein as the "host user") to customize the playlist using various parameters, such as users to associate with the playlist, user permissions for the playlist (e.g., whether a given user can edit the playlist or only view and play the playlist), which media content provider 118 services to associate with the playlist, whether the playlist is available for access globally or restricted to a specified group of users, etc.

In an embodiment, the credentials associated with the media content provider 118 services of the user creating the playlist are associated with the playlist. Doing so allows users that have access to the playlist to add content items provided by those services, even if the users do not have a subscription to one or more of those services. In other embodiments, the queue app 112 may be configured to restrict the playlist to services commonly subscribed to by users contributing to the playlist. In yet other embodiments, the queue app 112 may be configured to associate content provider service credentials of at least one other user besides the host user of the playlist, e.g., in cases where the host user does not have credentials to a particular service and the content provide service allows such action through a license. The platform application 106 may communicate with a given content provider service using that service's API to connect the queue app 112 with the streaming service, transmit data requests (e.g., for content item data and metadata), receiving data in response, and the like.

In an embodiment, the queue app 112 also allows for playback of the content media items listed in the playlist via the computing device 110. When a user (e.g., the host user or another user associated with the playlist) initiates play of the playlist via the queue app 112, the queue app 112 may iterate through each of the content items listed in the playlist and playback the content item via an audiovisual output connected with the computing device 110 of the host user (e.g., the audio output of the computing device 110, one or more speakers connected to the computing device 110 via a wired or wireless connection, a television connected with the computing device 110 via a wired connection or via a wireless media streaming protocol or device, etc.).

The platform 102 may include additional collaboration features. For example, the platform application 106 may allow users to reorder entries in a given collaboration playlist. The platform application 106 may allow users to do so manually, and further may provide features allowing users to vote on whether to "promote" a given entry to be played prior to other entries on the playlist or "demote" the entry to be played after other entries. As another example, the platform 102 may enable a host user to configure a playlist such that it applies priority rules to a given user or content item, such that content items associated with a particular user or the content item itself is given priority during playback of the underlying playlist. As yet another example, the platform 102 may allow for certain override functionality, such as by a host or designated user associated with the playlist. As yet another example, the platform 102 may allow the host user to set access permissions for users on a given playlist, like whether a given user may add or remove content items to a playlist, only add to a playlist, only view a playlist, and so on. Further, the platform 102 may also allow the host user to set password protections for access to the playlist. Other examples include the ability to allow users to skip content items or contributions by a given user during playback of the playlist, the ability to receive contributions by users not explicitly associated with a playlist, the ability to create a whitelist for content items allowed by a host user to be inserted into a playlist, the ability to create a blacklist for content items that cannot be added to a playlist. Further, the platform 102 may allow a given user to save playlists locally to the computing device 110 or download playlists created by other users or groups of users. Further still, the platform 102 may allow the user to export a playlist to a media content provider 118 service (e.g., for playback via a streaming app 116).

In an embodiment, the platform 102 may also provide social media functions, such as user profiles accessible by others on the platform displaying information such as playlists created, songs that the user had contributed to playlists, genres that the user is inclined to choose in adding content to a playlist, ratings scores assigned by other users indicative of the user's taste in music, etc.

In an embodiment, the platform 102 may also provide users with access to content creator information, such as music artist websites, bios, concert schedules, merchandise, and apply follow tags to the artists and access payment links or other functionalities to contribute money to the artists. For instance, the platform 102 may integrate a user's existing payment services (e.g., APPLE PAY, PAYPAL, VENMO) with the queue app 112 to facilitate payment.

Figure 2:
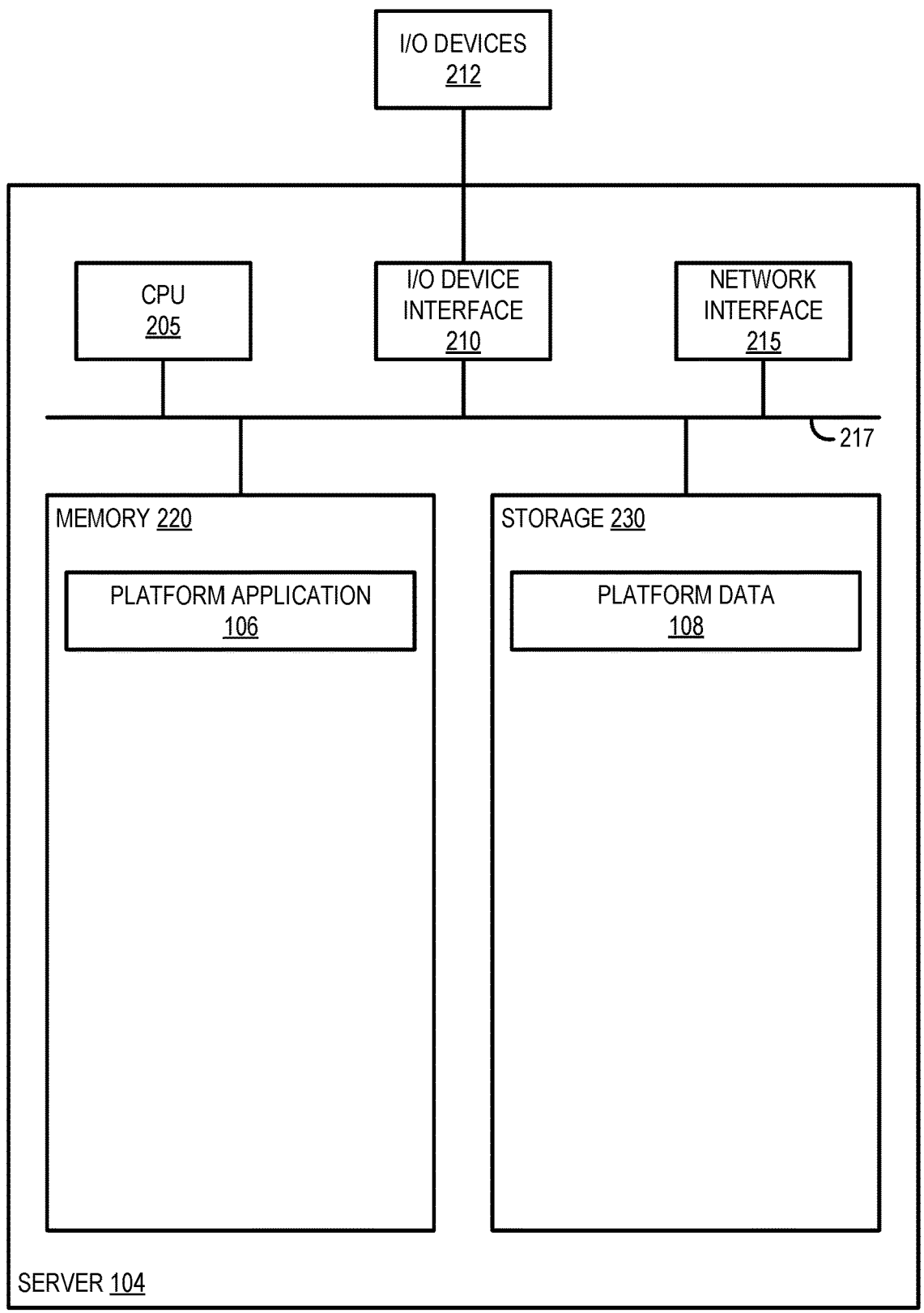
FIG. 2 illustrates a block diagram of the example platform server described relative to FIG. 1, according to an embodiment.

FIG. 2 is a block diagram further illustrating components of an example server 104 of the platform 102. As shown, the server 104 includes, without limitation, a central processing unit (CPU) 205, an I/O device interface 210, one or more I/O devices 212, and a network interface 215, each interconnected via a hardware bus 217. Of course, an actual server 104 can include a variety of additional hardware components, such as graphics processing units and cooling fans.

The CPU 205 retrieves and executes programming instructions stored in the memory 220 (e.g., of the platform application 106). Similarly, the CPU 205 stores and retrieves data residing in the storage 230. The hardware bus 217 is used to transmit instructions and data between the CPU 205, storage 230, network interface 215, and the memory 220. CPU 205 is included to be representative of a single CPU, multiple CPUs, a single CPU having multiple processing cores, and the like. The memory 220 is generally included to be representative of memory and storage on a mobile device, e.g., DDR and flash memory spaces. The network interface 215 may be embodied as any hardware, software, or circuitry (e.g., a network interface card) used to connect the server 104 over a network and communicate with the computing device 110 and services provided by the media content providers 118.

The I/O device interface 210 allows the I/O devices 212 to communicate with hardware and software components of the server 104. The I/O devices 212 may be embodied as any type of input/output device connected with or provided as a component to the server 104. I/O devices such as keyboards, mouse devices, and printers may be included as I/O devices 212 (e.g., as part of a management console operated by an administrator of the server 104).

Illustratively, the memory 220 includes the platform application 106, which carries out functions described herein relative to FIG. 1. The platform application 106 may provide an API for external applications to use in communicating with the software platform (e.g., for facilitating retrieval and storage of application data, accessing particular functions provided by the platform application 106, etc.).

The storage 230 may include the platform data 108. As stated, the platform data 108 comprises any data created and/or managed by the platform application 104. This can include data associated with each created playlist (e.g., configured parameters associated with the playlist, metadata associated with the playlist such as playlist identifiers, timestamps, total length of content items in the playlist, etc.), user data (e.g., user profile information, billing information, subscription information, content provider credential data, etc.), and media content provider data (e.g., streaming service API data, licensing data, etc.). The platform data 108 may also include other data, such as data relating to media content (e.g., artist profile data, promotional data, advertising, etc.).

Figure 3:
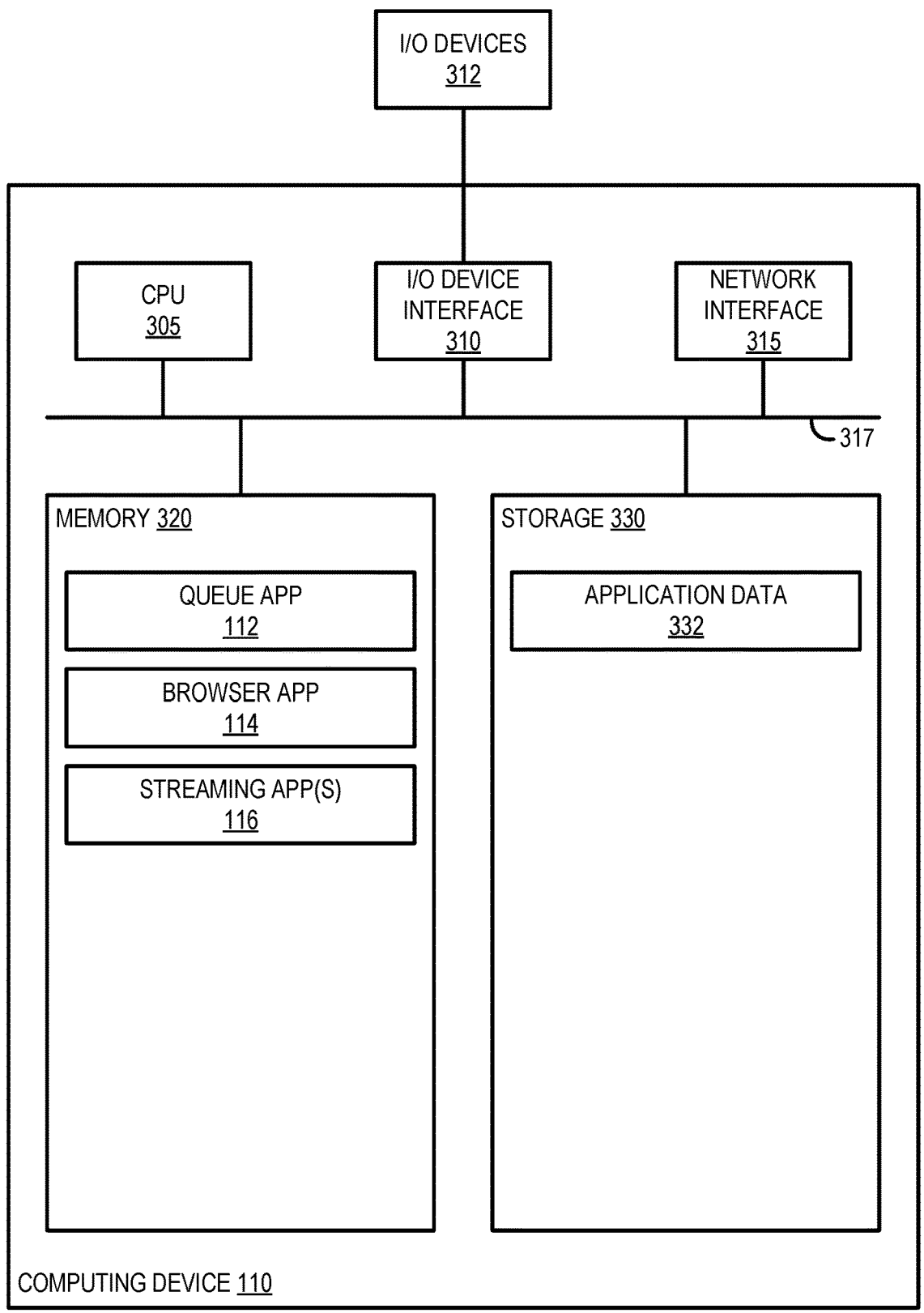
FIG. 3 is a block diagram of an example computing device described relative to FIG. 1, according to an embodiment.

FIG. 3 illustrates a computing device 110, according to an exemplary embodiment. The computing device 110 may represent the operator device 108 or the assessor device 112 described relative to FIG. 1. As shown, the computing device 110 includes, without limitation, a central CPU 305, an I/O device interface 310, one or more I/O devices 312, and a network interface 315, each interconnected via a hardware bus 317. Of course, a computing device 110 will include a variety of additional hardware components.

The CPU 305 retrieves and executes programming instructions stored in the memory 320. Similarly, the CPU 305 stores and retrieves data residing in the storage 330. The hardware bus 317 is used to transmit instructions and data between the CPU 305, storage 330, network interface 315, and the memory 320. CPU 305 is included to be representative of a single CPU, multiple CPUs, a single CPU having multiple processing cores, and the like. The memory 320 is generally included to be representative of memory and storage on a mobile device, e.g., DDR and flash memory spaces. The network interface 315 may be embodied as any hardware, software, or circuitry (e.g., a network interface card) used to connect the computing device 110 with the platform 102 over the network 120 and other devices or servers. In addition, the network interface 315 may also be used to connect the computing device 110 wirelessly with I/O devices 312 such as audio speakers that pair using some form of wireless communication protocol (e.g., BLUETOOTH).

The I/O device interface 310 allows the I/O devices 312 to communicate with hardware and software components of the computing device 110. The I/O devices 312 may be embodied as any type of input/output device connected with or provided as a component to the computing device 110, such as cameras (e.g., front- and rear-facing cameras of a smart phone), audio I/O devices, keyboards, mouse devices, and printers may be included as I/O devices 212.

Illustratively, the memory 320 includes the queue app 112, browser app 114, and the streaming apps 116 discussed relative to FIG. 1. Further, the storage 330 includes application data 332, which may be embodied as any data associated with the platform 102 that is locally stored on the computing device 110. For example, application data 332 may include local copies of playlist data, user data, stored credentials (e.g., content service credentials, payment credentials, etc.), and the like.

Figure 4:
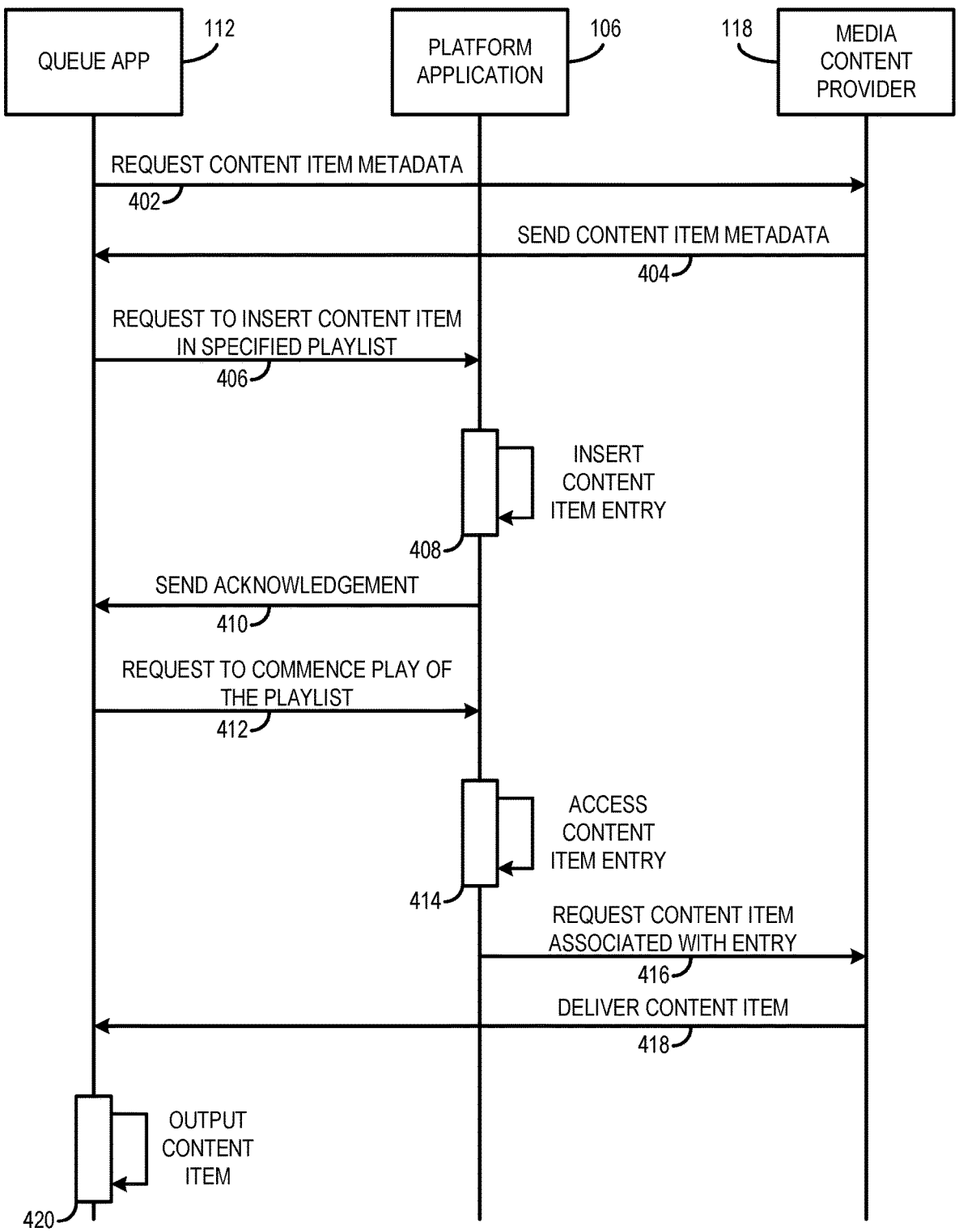
FIG. 4 is a flow diagram of an example communication exchange between a computing device, a platform server, and a media content provider during creation, population, and play of a collaborative media content playlist, according to an embodiment.

Referring now to FIG. 4, a communication flow 400 is shown between the queue app 112 executing on a computing device 110, the platform application 106, and a streaming service of media content provider 118 for managing and playing a collaborative playlist. Although this example uses a streaming app for reference, one of skill in the art will recognize that a variety of content delivery services may be adapted to this example and other example embodiments disclosed herein.

For this example, assume that a user has already created a playlist through the queue app 112. The user may access the playlist through the queue app and begin to add content items to the playlist of the given media content provider 118. The user may do so by accessing an add functionality within the user interface of the queue app 112. The add functionality may enable the user to search within the streaming service for a desired content item. In 402, the queue app 112 sends a request for metadata associated with the desired content item from the media content provider 118. In 404, the media content provider 118 sends the content item metadata (e.g., a content item identifier, title information, artist or creator information, length information, and the like) to the queue app 112. In 406, the queue app 112 sends a request to the platform application 106 to insert the content item in the playlist. The request may include the content item metadata retrieved from the media content provider 118. In 408, the platform application 106 inserts the content item as an entry of the playlist. In 410, the platform application 106 sends an acknowledgement to the queue app 112 that the content item has been added. As further described relative to FIG. 6, users can continue to add to or modify the playlist.

In 412, the computing device 110 may send a request to commence play of the playlist. The platform application 106 receives the request and iterates through the playlist. In 414, the platform application 106 accesses a content item entry (e.g., in a first-in-first-out manner, last-in-first-out, or some other ordering). Particularly, the platform application 106 may access metadata associated with the underlying entry item, such as a content identifier and streaming service identifier. In block 416, the platform application sends a request to the media content provider 118 (e.g., as identified through a streaming service identifier in the content item entry of the playlist) along with any other metadata used to retrieve the content item, such as a content identifier, as well as device identifier associated with the host user of the playlist. In 418, the service of media content provider 118 delivers the content item to the queue app 112 for playback, e.g., by streaming the content item data to the queue app 112. In 420, the queue app 112 outputs the content item, e.g., via an audio output device connected with the computing device 110.

Figure 5:
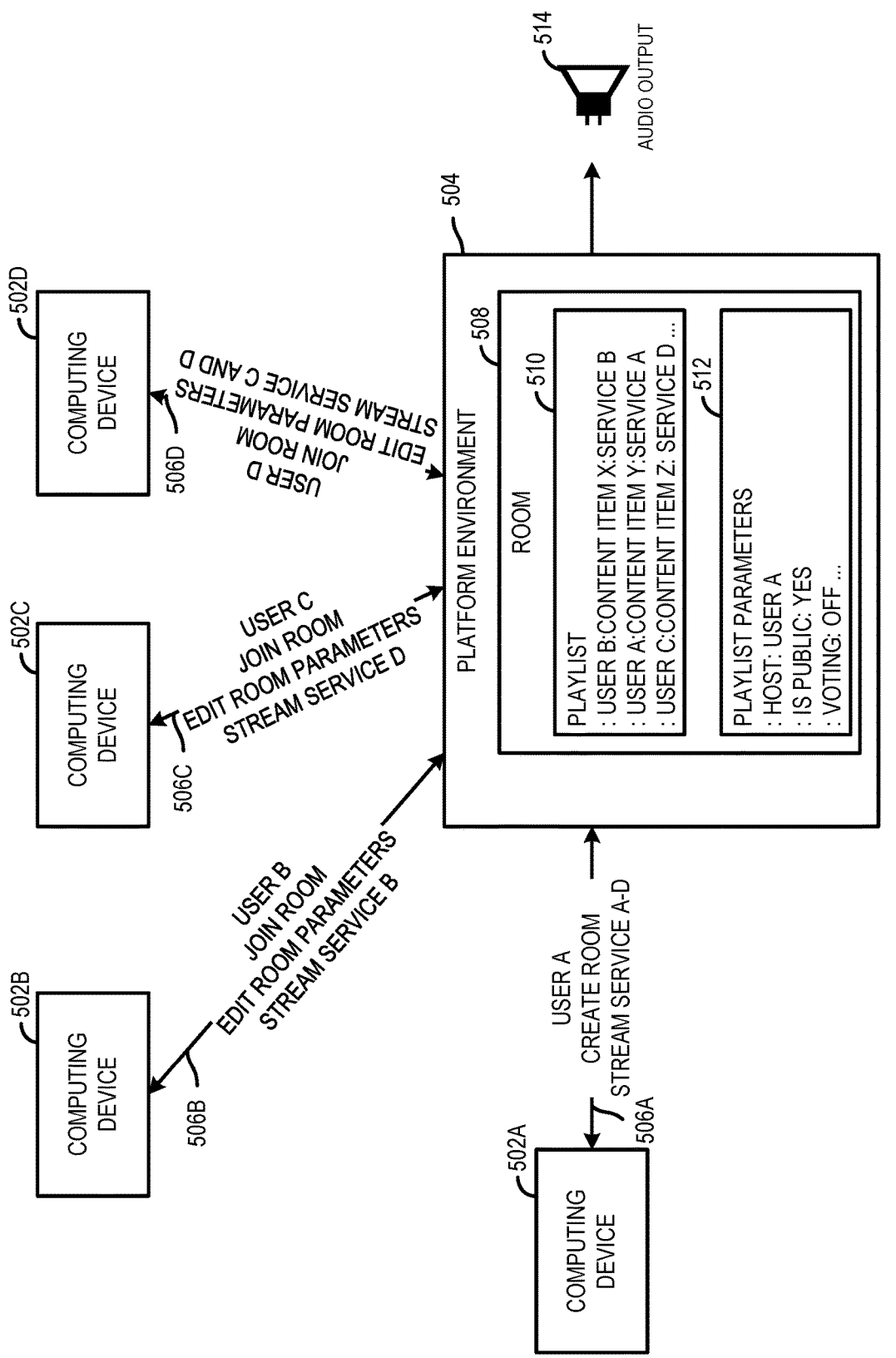
FIG. 5 is a conceptual diagram of an example use scenario for creating, managing, and playing a collaborative media content playlist, according to an embodiment.

Referring now to FIG. 5, a conceptual diagram of an example 500 of creating, managing, and playing a collaborative playlist according to the embodiments disclosed herein is shown. Illustratively, computing devices 502A-D are shown as being connected to a platform environment 504, e.g., via the queue apps executing on each device 502.

In this example 500, each of the computing devices 502A-D performs a series of actions in creating the playlist. At 506A, a user A of the computing device 502A may create a "room" within the environment 504. In an embodiment, the queue app may provide abilities to create a room, which may represent a virtual space within the environment 504 that users may join (e.g., via an invite from the user A, a link provided as a Uniform Resource Locator (URL) to the room, a listing of rooms provided by the app) and collaborate on a playlist. Here, the user A creates a room 508. Within the room 508, the user A may create one or more playlists, including playlist 510, configure one or more playlist parameters 512, and invite other users B-D to collaborate on the playlist 510, such as by adding or removing content items from the playlist 510. In this example 500, the playlist parameters 512 allow the user A to specify a host of the playlist, whether the playlist is publicly available in the platform environment 504, whether voting for content is enabled, etc. Of course, other playlist parameters 512 may be specified, such as whether to limit user selections of content items to a number of turns, whether certain user selections should be given priority in the playlist 510, whether certain users should be given priority, etc.

Further, as shown relative to 506A-D, each of users A-D may join the room 508 and populate, via the respective computing devices, the playlist 510 with content media, such as songs from differing streaming services A-D. Illustratively, the playlist 510 shows content item entries populated by the users in the room 508. Particularly, each entry provides data such as the user that added the item to the playlist, the content item, the media content service providing the service. Of course, the entry may include additional data, such as length of the content, a play count, a priority level, etc.

Further still, any of the users can initiate playback of the playlist. In an embodiment, playback occurs via the host device. Consequently, the computing device 502A plays content items from the playlist via an audio output 514. The audio output 514 can be speakers of the computing device 502A, speakers that are wirelessly connected with the computing device 502A (e.g., using the BLUETOOTH protocol), speakers connected to the computing device 502A through a wired connection, an audio output of devices connected wirelessly (e.g., via a WIFI connection over the Internet) and the like. In other embodiments, the host user can designate the computing device to carry out playback, e.g., via the playlist parameters 512.

Figure 6:
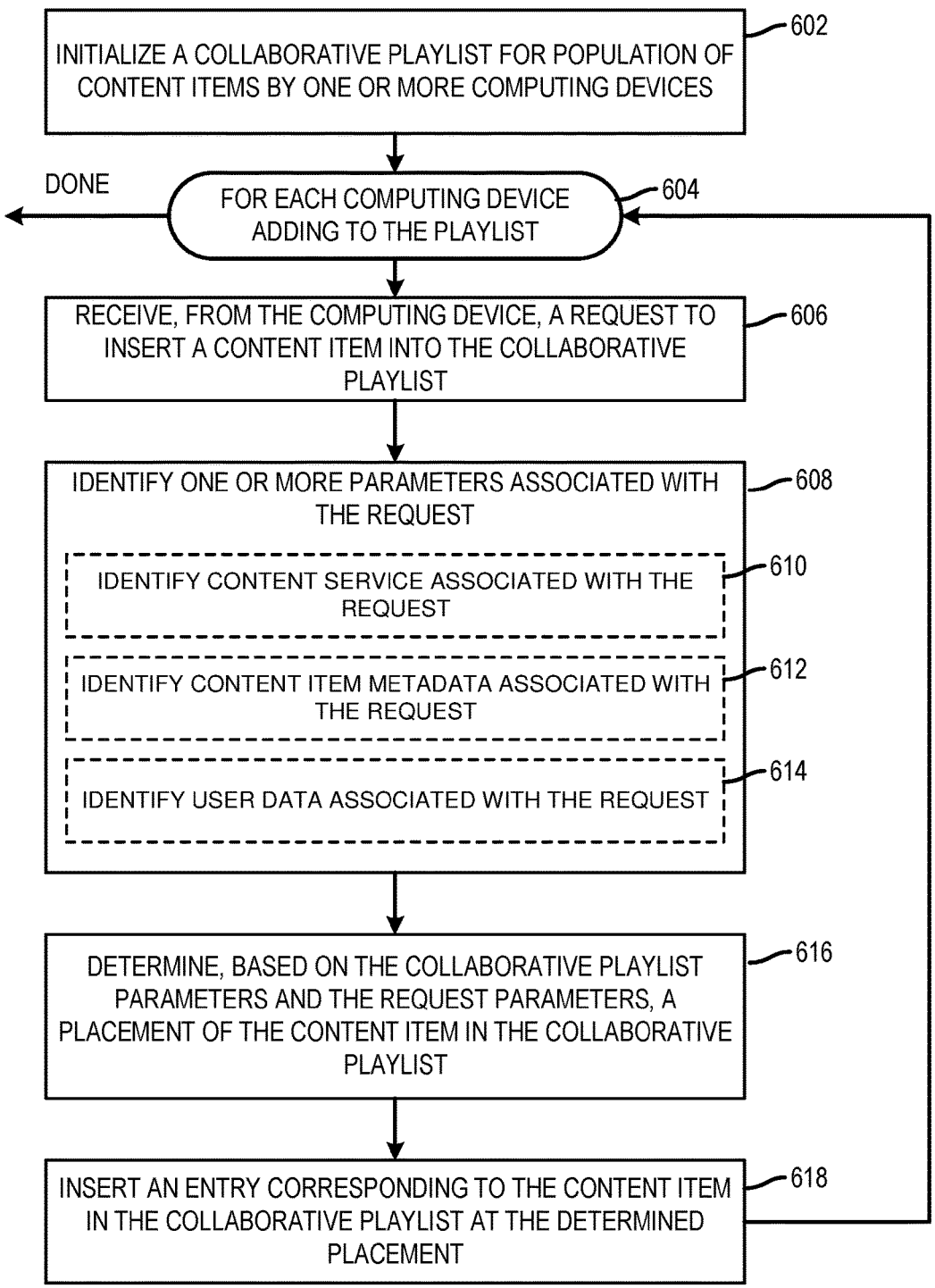
FIG. 6 is a flow diagram of an example method for creating and populating a collaborative media content playlist, according to an embodiment.

Referring now to FIG. 6, the platform application 106, in operation, may perform a method 600 for creating and managing a collaborative playlist for one or more users. For example, the method 600 may be performed in response to a computing device 110 (via the queue app 112 executing thereon) sending a request to the platform application 106 to create a collaborative playlist to be populated with content items by one or more computing devices. As shown, the method begins in block 602, in which the platform application 106 initializes the collaborative playlist. For example, to do so, the platform application 106 may create a queue data structure representing the collaborative playlist. The data structure may take, for example, entries corresponding to content items. The computing device 110 may specify other platform users who may contribute to the playlist and other parameters, such as whether any of the specified platform users have limited access (e.g., view-only access, play-only access), a minimum amount of content items to provide by each user before playback, a maximum amount of content items to provide by each user, etc.

In block 604, the method 600 enters a loop while each computing device 110 of users collaborating on the playlist continue to add to the playlist. In block 606, the platform application 106 receives, from a given computing device, a request to insert a content item (e.g., an audio item, video item, etc.). The request may include one or more parameters. In block 608, the platform application 106 identifies the one or more parameters associated with the request. For example, in block 610, the platform application 106 identifies the content service associated with the request. As another example, in block 612, the platform application 106 identifies the content item metadata (e.g., identifier, title, artist or creator, etc.) associated with the item in the request. As yet another example, in block 614, the platform application 106 identifies user data associated with the request (e.g., a user identifier).

In block 616, the platform application 106 determines, based on the parameters associated with the collaborative playlist and on the request, a placement of the content item in the collaborative playlist. The placement may be determined based on, for example, whether the host user set parameters such as user priority (e.g., users of a given priority to have content items played ahead of others), content item priority (e.g., content items by a given artist, title, publisher, etc. are played ahead of others), and other parameters. Once determined, in block 618, the platform application 106 generates a corresponding entry based on the identified parameters and inserts a corresponding entry to the requested content item into the collaborative playlist at the determined placement. For example, to do so, the platform application 106 may format the metadata obtained from the request into an entry data object for storage in the queue data structure representing the collaborative playlist.

Figure 7:
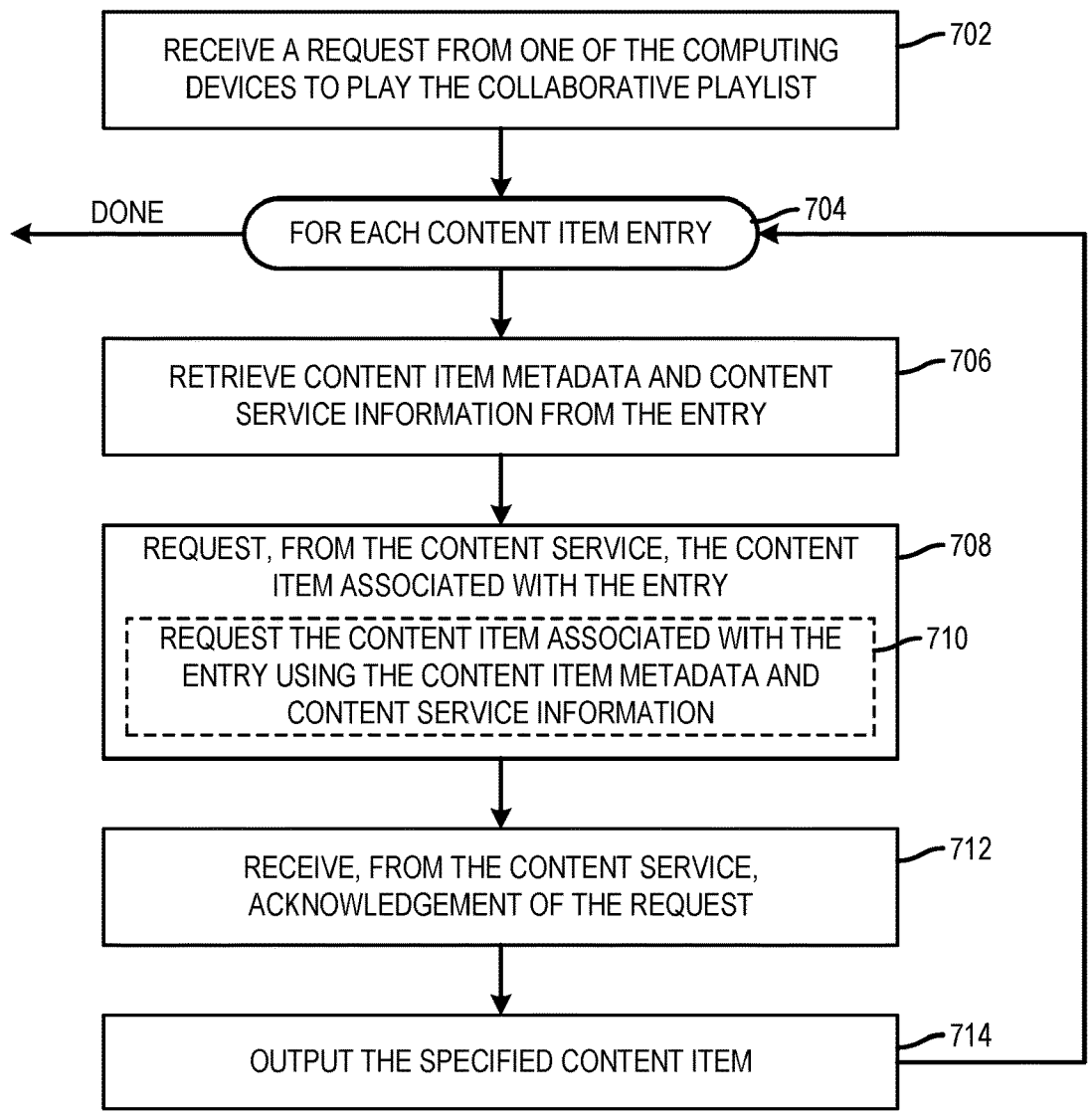
FIG. 7 is a flow diagram of an example method for playing a collaborative media content playlist, according to an embodiment.

Referring now to FIG. 7, the platform application 106, in operation, may perform a method 700 to coordinate with the computing devices 100 associated with a given collaborative playlist in the platform 102 and play the content items contained therein. Advantageously, in doing so, the platform 102 enables a user to play content items from heterogeneous media content providers (e.g., via the queue app 112 executing on a given computing device 110). For example, given a collaborative playlist of music audio content from different content streaming services (e.g., SPOTIFY, YOUTUBE MUSIC, TIDAL), a user may play the content through an individual unified application, e.g., the queue app 112. Note, although the method 700 is described as being performed by the platform application 106, one of skill in the art will recognize that the example steps carried out as part of method 700 may also adapted to be carried out directly by the queue app 112 executing on a given computing device 110.

As shown, the method 700 begins in block 702, in which the platform application 106 receives a request from one of the computing devices (e.g., a device associated with the host user of the collaborative playlist) to play the collaborative playlist. The request may include an identifier associated with the playlist to allow the platform application 106 to retrieve the specified playlist, e.g., from a storage location managed by the platform 102.

In block 704, the platform application 106 enters a loop while iterating through each content item entry in the collaborative playlist. In block 706, the platform application 106 retrieves content item metadata and content service information from the entry. The particular entry may be retrieved based on an order of the playlist and parameters configured for the playlist. For example, the playlist may be configured for retrieval on a first-in-first-out basis, a last-in-first-out basis, and so on.

In block 708, the platform application 106 requests, from the identified content service, the content item associated with the entry. For example, to do so, in block 710, the platform application 106 requests the content item associated with the entry using the content item metadata and the content service information. More particularly, the platform application 106 may formulate a request according to an API associated with the identified content service and include the content item metadata in the request.

In block 712, the platform application 106 may receive an acknowledgement from the content service of the request. The acknowledgement may indicate that the content service is delivering the content item to the computing device 110 for output by the computing device 110. In an embodiment, the platform application 106 may receive the content item from the content service. In turn, in block 714, the platform application 106 may output the specified content item to the computing device 110 for playback. The platform application 706 may continue to iterate through the collaborative playlist until, e.g., a user stops playback, playback automatically stops by reaching the end of the list (and a repeat function is not enabled), etc.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

The invention claimed is:

1. A method for managing a collaborative playlist, comprising:
    receiving, by execution of one or more processors, a request from a first user of a plurality of users to create a first virtual space of a plurality of virtual spaces within a collaborative playlist platform, wherein each of the plurality users is associated with a user profile on the collaborative playlist platform, each user profile providing access to information of a given user in the plurality of users, the information comprising historical playlist data of the user, song data that the user has contributed to a playlist, and rating score data applied to the user by one or more of the plurality of users indicative of a preference of music for the user;
    associating one or more of the plurality of users and the collaborative playlist with the first virtual space;
    receiving, from the first user, one or more user permissions to assign to each of the one or more of the plurality of users for accessing the collaborative playlist in the virtual space;
    receiving a request from the first user to insert a first media content item to the collaborative playlist, wherein the first media content item is provided by a first media content service of a plurality of media content services;
    receiving a request from a second user of the one or more of the plurality of users associated with the first virtual space to insert a second media content item to the collaborative playlist, wherein the second media content item is provided by a second media content service of the plurality of media content services;
    generating a first entry corresponding to the first media content item and a second entry corresponding to the second media content item;
    inserting the first entry and the second entry to the collaborative playlist;
    receiving, from each of the one or more of the plurality of users, a rating score for the first user based on the request from the first user; and
    applying the rating score received from the one or more of the plurality of users to the user profile associated with the first user.

2. The method of claim 1, further comprising identifying one or more request parameters associated with the request from the first user of the plurality of users to insert the first media content item to the collaborative playlist.

3. The method of claim 2, wherein identifying the one or more parameters comprises identifying the first media content service in the request from the first user, identifying metadata of the first media content item, and identifying data associated with the first user.

4. The method of claim 2, further comprising determining, based on the identified one or more request parameters and on one or more playlist parameters associated with the collaborative playlist, a placement in the collaborative playlist of the first entry relative to the second entry, wherein the first entry is inserted to the collaborative playlist based on the determination.

5. The method of claim 1, further comprising, outputting the first content item and the second media content item to a computing device of the first user for playback via an application executing on the computing device.

6. The method of claim 1, wherein the plurality of media content services correspond to a plurality of audio streaming services.

7. The method of claim 1, wherein the plurality of media content services correspond to a plurality of video streaming services.

8. A system comprising,
    one or more processors;
    a memory having a plurality of instructions, which, when executed by the one or more processors, causes the system to:
        receive a request from a first user of a plurality of users to create a first virtual space of a plurality of virtual spaces within a collaborative playlist platform, wherein each of the plurality users is associated with a user profile on the collaborative playlist platform, each user profile providing access to information of a given user in the plurality of users, the information comprising historical playlist data of the user, song data that the user has contributed to a playlist, and rating score data applied to the user by one or more of the plurality of users indicative of a preference of music for the user;

associate one or more of the plurality of users and the collaborative playlist with the first virtual space;

receive, from the first user, one or more user permissions to assign to each of the one or more of the plurality of users for accessing the collaborative playlist in the virtual space;

receive a request from the first user to insert a first media content item to the collaborative playlist, wherein the first media content item is provided by a first media content service of a plurality of media content services;

receive a request from a second user of the one or more of the plurality of users associated with the first virtual space to insert a second media content item to the collaborative playlist, wherein the second media content item is provided by a second media content service of the plurality of media content services;

generate a first entry corresponding to the first media content item and a second entry corresponding to the second media content item;

insert the first entry and the second entry to the collaborative playlist;

receive, from each of the one or more of the plurality of users, a rating score for the first user based on the request from the first user; and apply the rating score received from the one or more of the plurality of users to the user profile associated with the first user.

9. The system of claim 8, wherein the plurality of instructions, when executed, further causes the system to identify one or more request parameters associated with the request from the first user of the plurality of users to insert the first media content item to the collaborative playlist.

10. The system of claim 9, wherein to identify the one or more parameters comprises to identify the first media content service in the request from the first user, identify metadata of the first media content item, and identify data associated with the first user.

11. The system of claim 9, wherein the plurality of instructions, when executed, further causes the system to determine, based on the identified one or more request parameters and on one or more playlist parameters associated with the collaborative playlist, a placement in the collaborative playlist of the first entry relative to the second entry, wherein the first entry is inserted to the collaborative playlist based on the determination.

12. The system of claim 8, wherein the plurality of instructions, when executed, cause the system to output the first content item and the second media content item to a computing device of the first user for playback via an application executing on the computing device.

13. The system of claim 8, wherein the plurality of media content services correspond to a plurality of audio streaming services.

14. The system of claim 8, wherein the plurality of media content services correspond to a plurality of video streaming services.

15. A non-transitory computer-readable storage medium storing instructions, which, when executed on a processor, causes a computing system to:

receive a request from a first user of a plurality of users to create a first virtual space of a plurality of virtual spaces within a collaborative playlist platform, wherein each of the plurality users is associated with a user profile on the collaborative playlist platform, each user profile providing access to information of a given user in the plurality of users, the information comprising historical playlist data of the user, song data that the user has contributed to a playlist, and rating score data applied to the user by one or more of the plurality of users indicative of a preference of music for the user;

associate one or more of the plurality of users and the collaborative playlist with the first virtual space;

receive, from the first user, one or more user permissions to assign to each of the one or more of the plurality of users for accessing the collaborative playlist in the virtual space;

receive a request from the first user to insert a first media content item to the collaborative playlist, wherein the first media content item is provided by a first media content service of a plurality of media content services;

receive a request from a second user of the one or more of the plurality of users associated with the first virtual space to insert a second media content item to the collaborative playlist, wherein the second media content item is provided by a second media content service of the plurality of media content services;

generate a first entry corresponding to the first media content item and a second entry corresponding to the second media content item;

insert the first entry and the second entry to the collaborative playlist;

receive, from each of the one or more of the plurality of users, a rating score for the first user based on the request from the first user; and apply the rating score received from the one or more of the plurality of users to the user profile associated with the first user.

16. The non-transitory computer-readable storage medium of claim 15, wherein the plurality of instructions, when executed, further causes the system to identify one or more request parameters associated with the request from the first user of the plurality of users to insert the first media content item to the collaborative playlist.

17. The non-transitory computer-readable storage medium of claim 16, wherein to identify the one or more parameters comprises to identify the first media content service in the request from the first user, identify metadata of the first media content item, and identify data associated with the first user.

18. The non-transitory computer-readable storage medium of claim 16, wherein the plurality of instructions, when executed, further causes the system to determine, based on the identified one or more request parameters and on one or more playlist parameters associated with the collaborative playlist, a placement in the collaborative playlist of the first entry relative to the second entry, wherein the first entry is inserted to the collaborative playlist based on the determination.

19. The non-transitory computer-readable storage medium of claim 15, wherein the plurality of instructions, when executed, cause the system to output the first content item and the second media content item to a computing device of the first user for playback via an application executing on the computing device.

20. The non-transitory computer-readable storage medium of claim 15, wherein the plurality of media content services correspond to a plurality of audio streaming services or a plurality of video streaming services.

* * * * *